(12) United States Patent
Meyer

(10) Patent No.: US 8,591,386 B2
(45) Date of Patent: Nov. 26, 2013

(54) EXERCISE APPARATUS WITH CABLE REPLACEMENT ASSEMBLY

(75) Inventor: Mathew R. Meyer, Montrose, MN (US)

(73) Assignee: Brunswick Corporation, Lake Forest, IL (US)

( * ) Notice: Subject to any disclaimer, the term of this patent is extended or adjusted under 35 U.S.C. 154(b) by 363 days.

(21) Appl. No.: 13/111,398

(22) Filed: May 19, 2011

(65) Prior Publication Data

US 2012/0295772 A1 Nov. 22, 2012

(51) Int. Cl.
*A63B 21/055* (2006.01)
*A63B 21/00* (2006.01)

(52) U.S. Cl.
USPC .............................................. 482/99; 482/92

(58) Field of Classification Search
USPC ......... 482/21, 23–24, 44, 51, 81–82, 92–139, 482/143–144, 148; 403/1, 6, 9, 10, 11, 403/13–14, 21, 52, 66, 72, 76, 78, 80, 403/83–85, 88, 90–117, 122–144, 202–203, 403/217–229, 274–285, 291–298, 300, 403/321–322.3, 325; 285/18, 31, 33, 223, 285/231–232, 235, 260–271, 304, 335, 285/338–343, 374, 382, 382.4–382.7
See application file for complete search history.

(56) References Cited

U.S. PATENT DOCUMENTS

| | | | |
|---|---|---|---|
| 6,406,407 B1 * | 6/2002 | Wiedmann et al. | 482/82 |
| 7,749,140 B1 | 7/2010 | Lindemeier et al. | |
| 8,262,544 B1 * | 9/2012 | Blackford | 482/105 |
| 2009/0062084 A1 * | 3/2009 | Gamboa et al. | 482/82 |
| 2011/0306474 A1 * | 12/2011 | Gamboa et al. | 482/81 |

\* cited by examiner

*Primary Examiner* — LoAn H. Thanh
*Assistant Examiner* — Joshua Lee
(74) *Attorney, Agent, or Firm* — Andrus, Sceales, Starke & Sawall, LLP

(57) ABSTRACT

A connection assembly is provided for connecting a user-coupled link to a resistance-bearing cable in exercise apparatus. An inner collar is provided in an axial gap between an outer collar and a barrel trappingly engaging the cable. A removal method is provided facilitating low cost component replacement.

12 Claims, 5 Drawing Sheets

EXERCISE APPARATUS WITH CABLE REPLACEMENT ASSEMBLY

BACKGROUND AND SUMMARY

The invention relates to exercise apparatus, and more particularly exercise apparatus having a connection assembly for connecting a user-coupled link to a resistance-bearing cable.

Exercise apparatus are known with various connection assemblies for connecting a user-coupled link to a resistance-bearing cable. Components, including the cable and other connection components, may suffer failure or damage, including kinking or wear, requiring replacement with a new component.

The present invention arose during continuing development efforts in the above technology.

DETAILED DESCRIPTION

Figure 1:
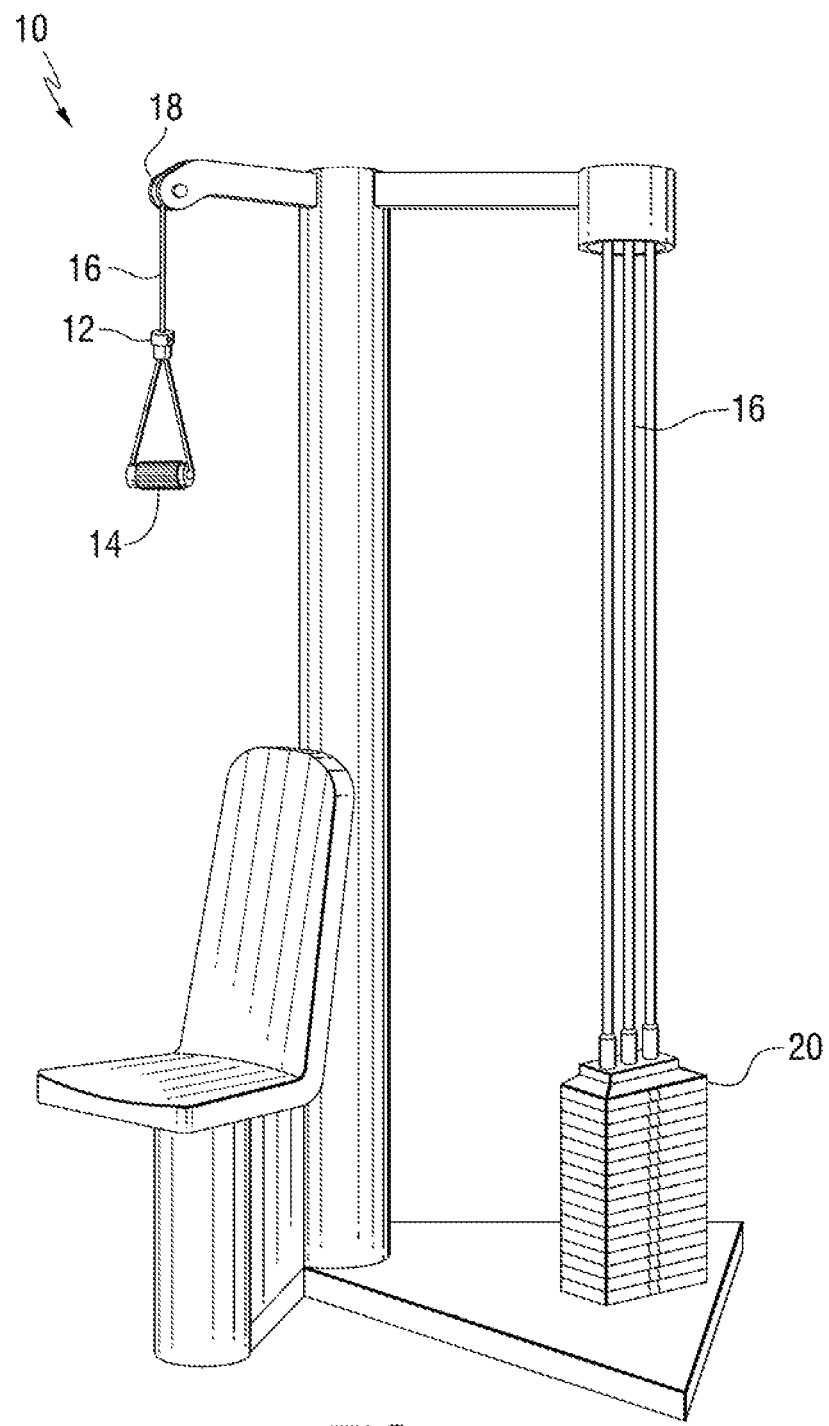
FIG. 1 is an isometric view of exercise apparatus and is taken from FIG. 1 of U.S. Pat. No. 7,749,140, incorporated herein by reference.
Figure 2:
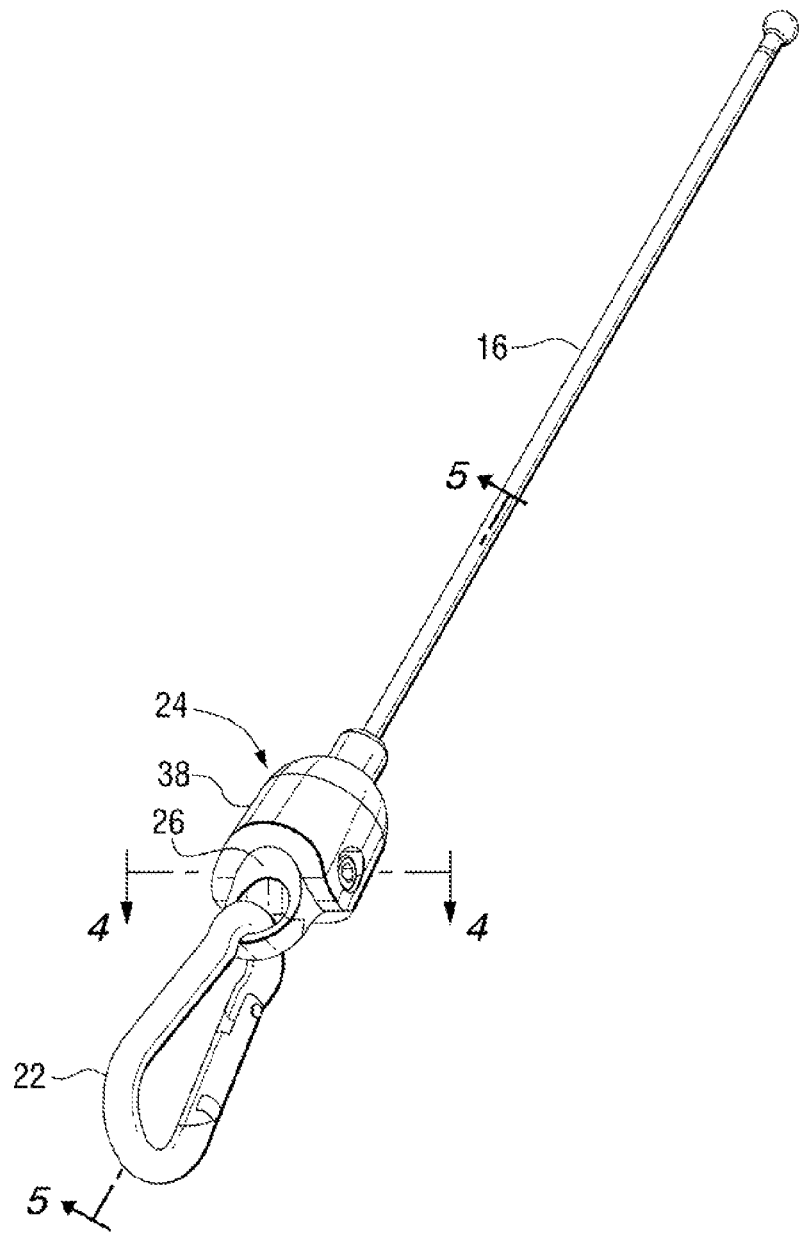
FIG. 2 is an isometric view of a connection assembly in accordance with the present disclosure.

FIG. 1 is taken from U.S. Pat. No. 7,749,140 and shows exercise apparatus 10 including a connection assembly 12 for connecting a user-gripped handle 14 to a resistance-bearing cable 16 which may for example be trained around a pulley system 18 and connected at its other end to a weight stack 20 or other resistance mechanism, as is known. The user-gripped handle may take various forms, including a single hand grip, a dual hand grip such as a crossbar, a pull rope, or a user-coupled link 22, FIG. 2, to any of the above or other user-gripped handle, attachments, or exercise member.

FIGS. 2-5 show a connection assembly 24 in accordance with the present disclosure for connecting user-coupled link 22 to resistance-bearing cable 16. A barrel or rigid link 26, FIG. 3, extends axially along an axis 28 and has first and second distally opposite axial ends 30 and 32. First axial end 30 engages user-coupled link 22. Second axial end 32 has a trap portion 34 engaging cable 16 at enlarged ball end 36 in trapped relation, as in the incorporated '140 patent. An outer collar 38 is provided around barrel 26 at second axial end 32 of the barrel and attached to the barrel, e.g. by set screws such as 40, 42 as in the incorporated '140 patent, to retain cable 16 in trapped relation engaging barrel 26. Outer collar 38 extends axially along axis 28 and has first and second distally opposite axial ends 44 and 46.

Figure 4:
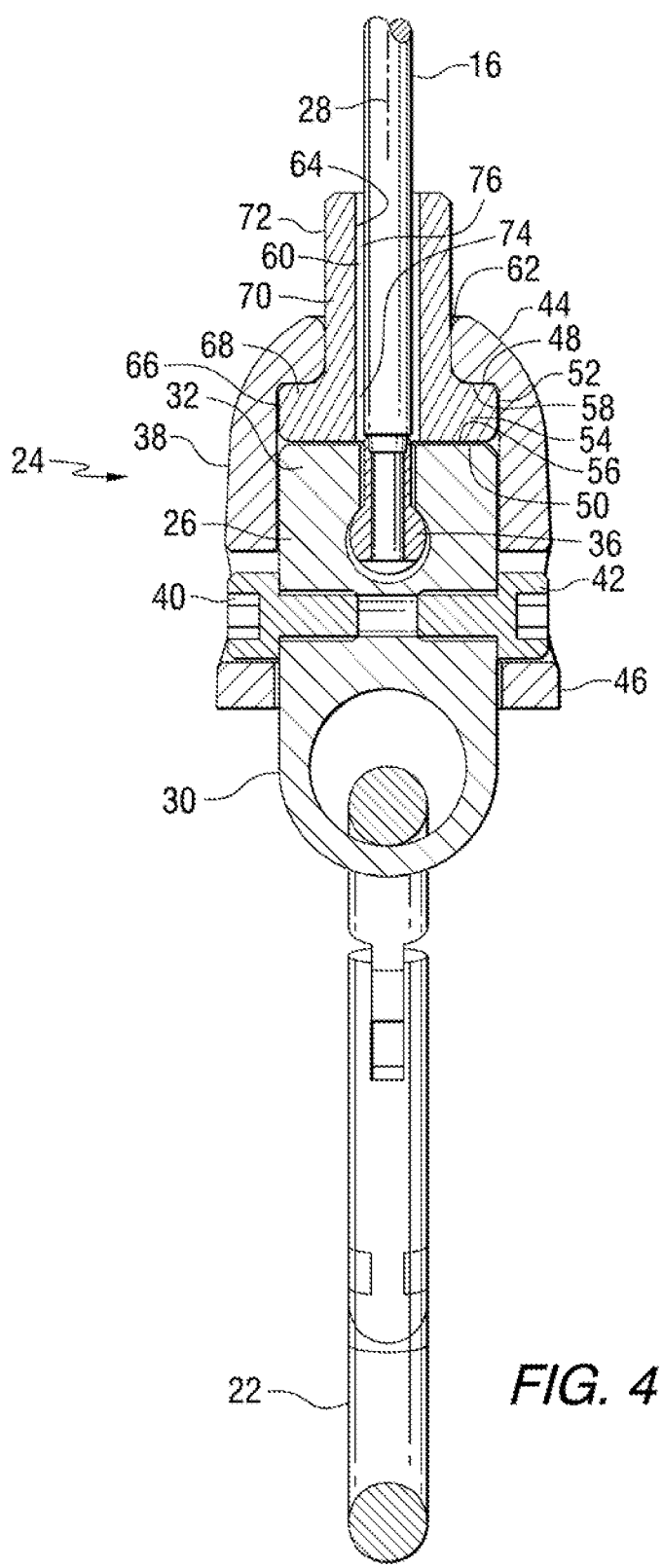
FIG. 4 is a sectional view taken along line 4-4 of FIG. 2.
Figure 5:
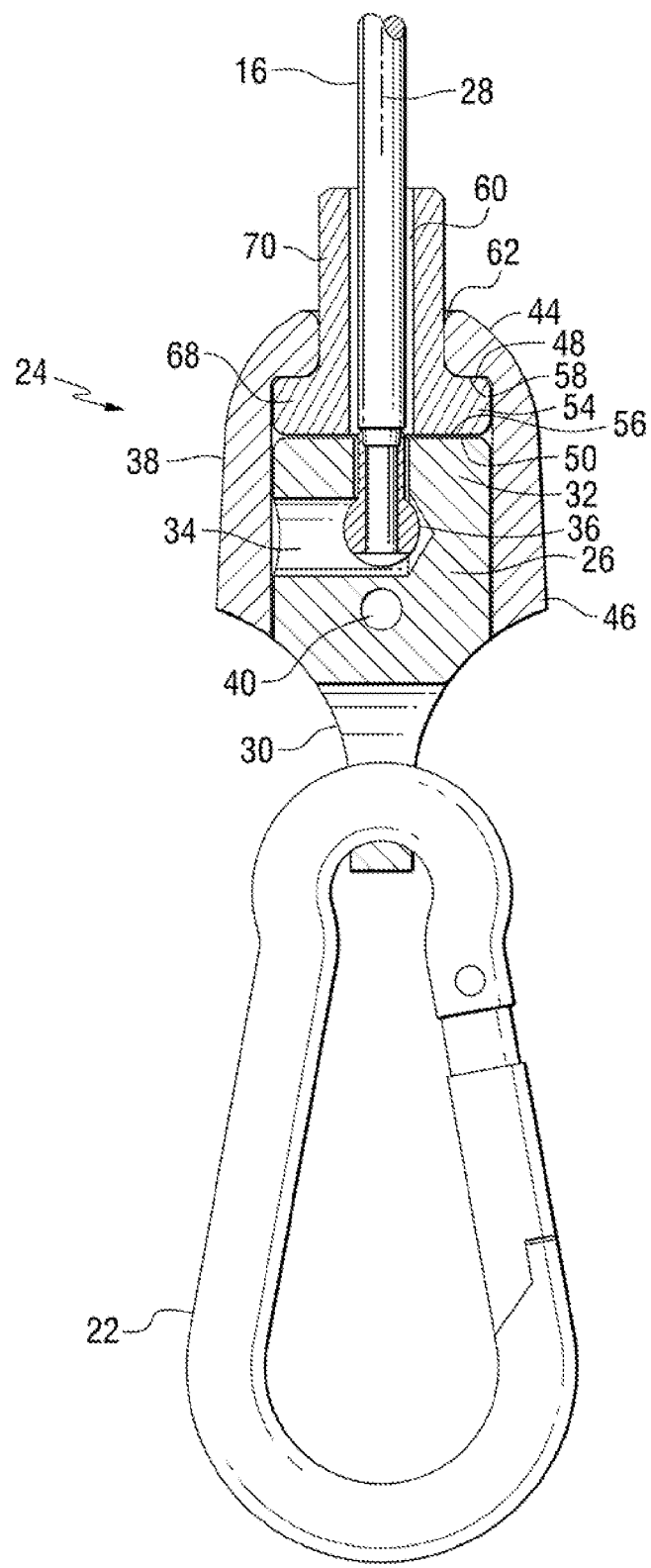
FIG. 5 is a sectional view taken along line 5-5 of FIG. 2.

First axial end 44 of outer collar 38 has a first axial end face 48, FIG. 4, facing in a first axial direction, e.g. downwardly in FIGS. 4, 5, toward barrel 26. Second axial end 32 of barrel 26 has a second axial end face 50 facing in a second axial direction, e.g. upwardly in FIGS. 4, 5, opposite to the noted first axial direction. First and second axial end faces 48 and 50 are axially spaced by an axial gap 52 therebetween. An inner collar 54 is provided in axial gap 52. Inner collar 54 has a third axial end face 56 facing in the noted first axial direction (downwardly in FIGS. 4, 5) and facing second axial end face 50. Inner collar 54 has a fourth axial end face 58 facing in the noted second axial direction (upwardly in FIGS. 4, 5) and facing first axial end face 48. Inner collar 54 is circumscribed by outer collar 38. Inner collar 54 circumscribes cable 16.

Figure 3:
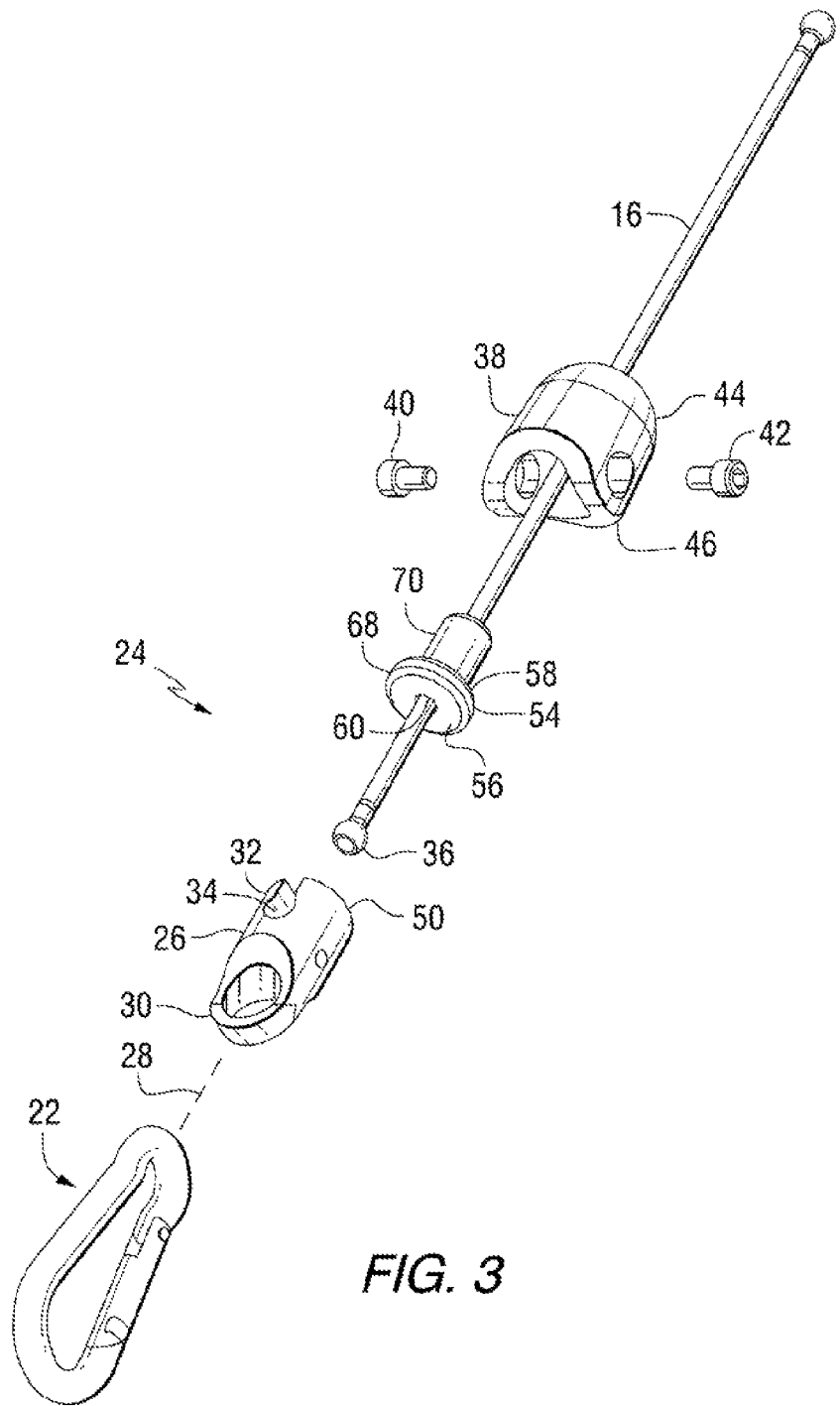
FIG. 3 is an exploded isometric view of the connection assembly of FIG. 2.

Inner collar 54 has an aperture 60, FIGS. 3, 4, extending axially therethrough. Cable 16 extends axially through aperture 60. First axial end 44 of outer collar 38 has an aperture 62 extending axially therethrough and axially aligned with aperture 60 of inner collar 54. The diameter of aperture 62 of the outer collar is greater than the diameter of aperture 60 of the inner collar. Inner collar 54 has an inner diameter 64 and an outer diameter 66. Inner diameter 64 is at aperture 60 of inner collar 54. Outer diameter 66 is greater than the diameter of aperture 62 of outer collar 38.

Inner collar 54 includes a flange 68, FIGS. 3, 4, within outer collar 38, and a sleeve 70 extending axially from flange 68 in the noted second axial direction (upwardly in FIGS. 4, 5) through aperture 62 in outer collar 38. Inner collar 54 has a first outer diameter 66 at flange 68, and has a second outer diameter 72 at sleeve 70. First outer diameter 66 is greater than the diameter of aperture 62 of outer collar 38. Second outer diameter 72 is less than or equal to the diameter of aperture 62 of outer collar 38. Aperture 60 of inner collar 54 has a first section 74 at flange 68, and a second section 76 at sleeve 70. First and second sections 74 and 76 are coaxially aligned. Inner collar 54 has a first inner diameter at first section 74, and a second inner diameter at second section 76, with such first and second inner diameters being equal.

In one embodiment, inner collar 54 is made of resilient or elastomeric material or the like, e.g. rubber, and is resiliently compressible in the axial direction, e.g. up-down in FIGS. 4, 5. Enlarged ball end 36 of cable 16 engages barrel 26, preferably metal or other hard, rigid material, in ball and socket trapped relation, as in the noted incorporated '140 patent. Inner collar 54 is also radially expansible at aperture 60 to a diameter at least as great as the diameter of enlarged ball end 36. Upon disengagement of outer collar 38 from barrel 26, e.g. by removing set screws 40, 42, and sliding outer collar 38 axially upwardly in FIGS. 4, 5, and upon disengagement of barrel 26 from enlarged ball end 36, e.g. by sliding ball end 36 transversely out of the socket and slot 34 of barrel 26, the inner collar 54, FIG. 3, may now be slid axially along cable 16 and around and over enlarged ball end 36 as the inner collar resiliently radially expands at aperture 60, to permit withdrawal of cable 16 axially from inner collar 54 by axially sliding enlarged ball end 36 through aperture 60 of inner collar 54 as the inner collar resiliently radially expands at aperture 60 to permit axial passage of enlarged ball end 36 therethrough. This permits easy replacement of cable 16, inner collar 54, or outer collar 38 with new components, in the event of failure or damage, e.g. kinking or wear of the old cable or other damage. Aperture 60 of inner collar 54 has a first relaxed at-rest diameter less than the diameter of enlarged ball end 36, and a second resiliently stretched diameter at least as great as the diameter of enlarged ball end 36. The diameter of aperture 62 of outer collar 38 is greater than the diameter of enlarged ball end 36. The connection assembly also allows relative rotation of the cable and the barrel and the user-coupled link. This enhances cable life. When the cable or end components, e.g. inner collar, outer collar, or barrel do need replacing, only the worn or damaged component need be replaced, not the entire assembly, thus providing maintenance cost reduction.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. Exercise apparatus comprising a connection assembly for connecting a user-coupled link to a resistance-bearing cable, comprising a barrel extending axially along an axis and having first and second distally opposite axial ends, said first axial end engaging said user-coupled link, said second axial end having a trap portion engaging said cable in trapped relation, an outer collar around said barrel at said second axial end of said barrel and attached to said barrel to retain said cable in trapped relation engaging said barrel, said outer collar extending axially along said axis and having first and second distally opposite axial ends, said first axial end of said outer collar having a first axial end face facing in a first axial direction toward said barrel, said second axial end of said barrel having a second axial end face facing in a second axial direction opposite to said first axial direction, said first and second axial end faces being axially spaced by an axial cap therebetween, an inner collar in said axial gap, said inner collar having a third axial end face facing in said first axial direction and facing said second axial end face, said inner collar having a fourth axial end face facing in said second axial direction and facing said first axial end face, said inner collar is circumscribed by said outer collar, said inner collar circumscribes said cable, said inner collar has an aperture extending axially therethrough, and said cable extends axially through said aperture of said inner collar, said first axial end of said outer collar has an aperture extending axially therethrough and axially aligned with said aperture of said inner collar, the diameter of said aperture of said outer collar is greater than the diameter of said aperture of said inner collar, said inner collar comprises a flange within said outer collar, and a sleeve extending axially from said flange in said second axial direction through said aperture in said outer collar.

2. The exercise apparatus according to claim 1 wherein said inner collar has a first outer diameter at said flange, and a second outer diameter at said sleeve, said first outer diameter being greater than the diameter of said aperture of said outer collar, said second outer diameter being less than or equal to the diameter of said aperture of said outer collar.

3. The exercise apparatus according to claim 2 wherein said aperture of said inner collar has a first section at said flange, and a second section at said sleeve, said first and second sections being coaxially aligned, and wherein said inner collar has a first inner diameter at said first section and a second inner diameter at said second section, said first and second inner diameters being equal.

4. The exercise apparatus according to claim 1 wherein said inner collar is resiliently compressible in said axial direction.

5. Exercise apparatus comprising a connection assembly for connecting a user-coupled link to a resistance-bearing cable, comprising a barrel extending axially along an axis and having first and second distally opposite axial ends, said first axial end engaging said user-coupled link, said second axial end having a trap portion engaging said cable in trapped relation, an outer collar around said barrel at said second axial end of said barrel and attached to said barrel to retain said cable in trapped relation engaging said barrel, said outer collar extending axially along said axis and having first and second distally opposite axial ends, said first axial end of said outer collar having a first axial end face facing in a first axial direction toward said barrel, said second axial end of said barrel having a second axial end face facing in a second axial direction opposite to said first axial direction, said first and second axial end faces being axially spaced by an axial gap therebetween, an inner collar in said axial gap, said inner collar having a third axial end face facing in said first axial direction and facing said second axial end face, said inner collar having a fourth axial end face facing in said second axial direction and facing said first axial end face, said inner collar is resiliently compressible in said axial direction, said inner collar is circumscribed by said outer collar, said inner collar circumscribes said cable, said inner collar has an aperture extending axially therethrough, said cable extends axially through said aperture and has an enlarged ball end engaging said barrel in ball and socket trapped relation, said inner collar is resiliently radially expansible at said aperture to a diameter at least as great as the diameter of said enlarged ball end, to permit, upon disengagement of said outer collar from said barrel, and said barrel from said enlarged ball end, withdrawal of said cable axially from said inner collar by axially sliding said enlarged ball end through said aperture of said inner collar as said inner collar resiliently radially expands at said aperture to permit axial passage of said enlarged ball end therethrough.

6. The exercise apparatus according to claim 5 wherein said aperture of said inner collar has a first relaxed at-rest diameter less than the diameter of said enlarged ball end, and has a second resiliently stretched diameter at least as great as the diameter of said enlarged ball end.

7. The exercise apparatus according to claim 5 wherein said first axial end of said outer collar has an aperture extending axially therethrough and axially aligned with said aperture of said inner collar, and wherein the diameter of said aperture of said outer collar is greater than the diameter of said enlarged ball end.

8. A connection assembly for connecting a user-coupled link to a resistance-bearing cable in exercise apparatus, comprising a barrel extending axially along an axis and having first and second distally opposite axial ends, said first axial end engaging said user-coupled link, said second axial end having a trap portion engaging said cable in trapped relation, an outer collar around said barrel at said second axial end of said barrel and attached to said barrel to retain said cable in trapped relation engaging said barrel, said outer collar extending axially along said axis and having first and second distally opposite axial ends, said first axial end of said outer collar having a first axial end face facing in a first axial direction toward said barrel, said second axial end of said barrel having a second axial end face facing in a second axial direction opposite to said first axial direction, said first and second axial end faces being axially spaced by an axial gap therebetween, an inner collar in said axial gap, said inner collar having a third axial end face facing in said first axial direction and facing said second axial end face, said inner collar having a fourth axial end face facing in said second axial direction and facing said first axial end face, said inner collar is circumscribed by said outer collar, said inner collar circumscribes said cable, said inner collar has an aperture extending axially therethrough, and said cable extends axially through said aperture of said inner collar, said first axial end of said outer collar has an aperture extending axially therethrough and axially aligned with said aperture of said inner collar, the diameter of said aperture of said outer collar is greater than the diameter of said aperture of said inner collar, said inner collar comprises a flange within said outer collar, and a sleeve extending axially from said flange in said second axial direction through said aperture in said outer collar, said inner collar has a first outer diameter at said flange, and a second outer diameter at said sleeve, said first outer diameter being greater than the diameter of said aperture of said outer collar, said second outer diameter being less than or equal to said diameter of said aperture of said outer collar.

9. The connection assembly according to claim 8 wherein said inner collar is resiliently compressible in said axial direction.

10. A connection assembly for connecting a user-coupled link to a resistance-bearing cable in exercise apparatus, comprising a barrel extending axially along an axis and having first and second distally opposite axial ends, said first axial end engaging said user-coupled link, said second axial end having a trap portion engaging said cable in trapped relation, an outer collar around said barrel at said second axial end of said barrel and attached to said barrel to retain said cable in trapped relation engaging said barrel, said outer collar extending axially along said axis and having first and second distally opposite axial ends, said first axial end of said outer collar having a first axial end face facing in a first axial direction toward said barrel, said second axial end of said barrel having a second axial end face facing in a second axial direction opposite to said first axial direction, said first and second axial end faces being axially spaced by an axial gap therebetween, an inner collar in said axial gap, said inner collar having a third axial end face facing in said first axial direction and facing said second axial end face, said inner collar having a fourth axial end face facing in said second axial direction and facing said first axial end face, said inner collar is resiliently compressible in said axial direction, said inner collar is circumscribed by said outer collar, said inner collar circumscribes said cable, said inner collar has an aperture extending axially therethrough, said cable extends axially through said aperture and has an enlarged ball end engaging said barrel in ball and socket trapped relation, said inner collar is resiliently radially expansible at said aperture to a diameter at least as great as the diameter of said enlarged ball end, to permit, upon disengagement of said outer collar from said barrel, and said barrel from said enlarged ball end, withdrawal of said cable axially from said inner collar by axially sliding said enlarged ball end through said aperture of said inner collar as said inner collar resiliently radially expands at said aperture to permit axial passage of said enlarged ball end therethrough, wherein said aperture of said inner collar has a first relaxed at-rest diameter less than the diameter of said enlarged ball end, and has a second resiliently stretched diameter at least as great as the diameter of said enlarged ball end, said first axial end of said outer collar has an aperture extending axially therethrough and axially aligned with said aperture of said inner collar, and the diameter of said aperture of said outer collar is greater than the diameter of said enlarged ball end.

11. A method for replacing a component in exercise apparatus having a connection assembly for connecting a user-coupled link to a resistance-bearing cable, said connection assembly having a barrel extending axially along an axis and having first and second distally opposite axial ends, said first axial end engaging said user-coupled link, said second axial end having a trap portion engaging said cable in trapped relation, an outer collar around said barrel at said second axial end of said barrel and attached to said barrel to retain said cable in trapped relation engaging said barrel, said outer collar extending axially along said axis and having first and second distally opposite axial ends, said first axial end of said outer collar having a first axial end face facing in a first axial direction toward said barrel, said second axial end of said barrel having a second axial end face facing in a second axial direction opposite to said first axial direction, said first and second axial end faces being axially spaced by an axial gap therebetween, said method comprising providing an inner collar in said axial gap, providing said inner collar with a third axial end face facing in said first axial direction and facing said second axial end face, providing said inner collar with a fourth axial end face facing in said second axial direction and facing said first axial end face providing said inner collar with an aperture extending axially therethrough, wherein said cable extends axially through said aperture and has an enlarged ball end engaging said barrel in ball and socket trapped relation, providing said inner collar as resilient member resiliently radially expansible at said aperture to a diameter at least as great as the diameter of said enlarged ball end, said method further comprising disengaging said outer collar from said barrel, disengaging said barrel from said enlarged ball end, withdrawing said cable axially from said inner collar by axially sliding said enlarged ball end through said aperture of said inner collar as said inner collar resiliently radially expands at said aperture to permit axial passage of said enlarged ball end therethrough.

12. The method according to claim 11 comprising replacing at least one of said cable, said inner collar, and said outer collar.

* * * * *